United States Patent
Kaal

(10) Patent No.: US 8,873,571 B2
(45) Date of Patent: Oct. 28, 2014

(54) DISTRIBUTING INFORMATION

(75) Inventor: Madis Kaal, Tallinn (EE)

(73) Assignee: Skype, Dublin (IE)

( * ) Notice: Subject to any disclaimer, the term of this patent is extended or adjusted under 35 U.S.C. 154(b) by 38 days.

(21) Appl. No.: 13/306,442

(22) Filed: Nov. 29, 2011

(65) Prior Publication Data

US 2013/0021949 A1  Jan. 24, 2013

(30) Foreign Application Priority Data

Jul. 18, 2011 (GB) .................................. 1112360.1

(51) Int. Cl.
| | | |
|---|---|---|
| *H04L 12/28* | (2006.01) | |
| *H04W 8/20* | (2009.01) | |
| *H04L 12/54* | (2013.01) | |
| *H04W 48/16* | (2009.01) | |
| *H04L 29/06* | (2006.01) | |

(52) U.S. Cl.
CPC ................ *H04L 63/20* (2013.01); *H04W 8/20* (2013.01); *H04L 12/5691* (2013.01); *H04W 48/16* (2013.01)
USPC ....................................................... 370/401

(58) Field of Classification Search
CPC ...... H04W 88/08; H04W 12/06; H04L 12/56; H04L 12/28; H04L 12/46
USPC ........................ 370/252, 254, 389, 400, 401
See application file for complete search history.

(56) References Cited

U.S. PATENT DOCUMENTS

| | | | | |
|---|---|---|---|---|
| 8,149,736 | B2 * | 4/2012 | Smith et al. .................... | 370/255 |
| 2007/0244920 | A1 * | 10/2007 | Palliyil et al. ................. | 707/102 |
| 2009/0196181 | A1 * | 8/2009 | Retana et al. ............... | 370/235.1 |
| 2009/0274094 | A1 * | 11/2009 | Engwer .......................... | 370/328 |
| 2011/0096695 | A1 * | 4/2011 | Natarajan et al. ............. | 370/254 |

FOREIGN PATENT DOCUMENTS

| | | |
|---|---|---|
| EP | 2166799 | 3/2010 |
| JP | 2009188922 | 8/2009 |
| WO | WO-2009134288 | 11/2009 |

OTHER PUBLICATIONS

"International Search Report and Written Opinion", Application No. PCT/US2012/047094, (Oct. 23, 2012), 12 pages.

* cited by examiner

*Primary Examiner* — Ricky Ngo
*Assistant Examiner* — Lan Huong Truong
(74) *Attorney, Agent, or Firm* — Sonia Cooper; Jim Ross; Micky Minhas

(57) ABSTRACT

Information related to a set of networks from a first node to a second node of a communication system can be distributed. A set of identifiers which belong to the set of networks can be stored at the first node. Hash values are generated at the first node for the identifiers in the set of identifiers using a hash function. The generated hash values are transmitted from the first node to the second node. The second node determines an identifier of a particular network available for communicating with the second node. The second node generates a hash value for the identifier using the hash function. The second node compares the hash value of the identifier with the hash values received at the second node from the first node to determine whether the particular network belongs to said set of networks.

27 Claims, 5 Drawing Sheets

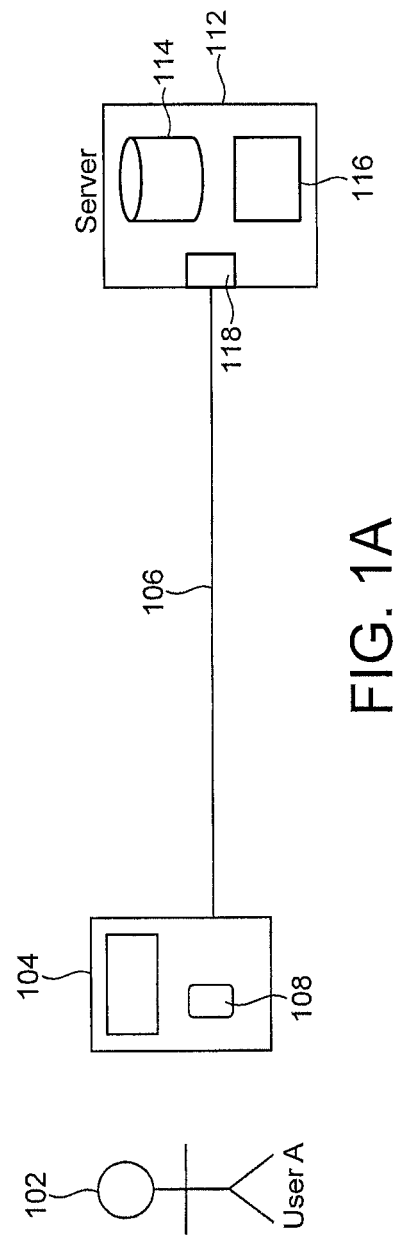

DISTRIBUTING INFORMATION

RELATED APPLICATION

This application claims priority under 35 U.S.C. §119 or 365 to Great Britain, Application No. GB 1112360.1, filed Jul. 18, 2011. The entire teachings of the above application are incorporated herein by reference.

TECHNICAL FIELD

The present invention relates to distributing information. In particular, the present invention relates to distributing information relating to a set of networks from a first node to a second node of a communication system.

BACKGROUND

A device may be able to connect to a number of different networks, thereby allowing access to the networks for a user of the device. Such networks may be Local Area Networks (LANs) or Wide Area Networks (WANs). The networks may be wired or wireless. The networks may allow a device to communicate with other networks such as the Internet. Where a network is a wireless network, a device can communicate with the network via a wireless connection, such as a WiFi connection. The range over which a wireless connection (such as a WiFi connection) can be used is limited (e.g. to about 10-100 m). Therefore, different wireless networks may be available for communication with the device at different times, depending upon the location of the device. Therefore, if the device is a mobile device then, as the device is moved, the wireless networks which are within range and available for communication with the device will change.

A network which is available for communicating with a device (or "user terminal") may be owned by somebody other than the user of the device. In this case the device may be allowed to connect to the network only if the user of the device engages in an authentication process with the owner of the network. For example, connections to WiFi networks may be provided in public places such as shopping centers, hotels, train stations, airports or coffee shops, and access to the WiFi networks may be provided to a device following an authentication process with the owner of the WiFi networks. However, the steps required in the authentication process may discourage some users from accessing the WiFi network because it often involves time-consuming sign up procedures.

"Skype Access" is a system which addresses some of the problems associated with the authentication process described above for allowing access to a WiFi network. A user of a device may be part of a communication system (such as the Skype™ communication system), and as such may have pre-authorization, in the communication system. Under a system such as the "Skype. Access" system, the pre-authorization of a user in the communication system can be used to allow access to a WiFi network where the owner of the WiFi network has agreed to acknowledge the pre-authorization provided by the communication system.

An authorization system such as the "Skype Access" system requires co-operation between the operator of the communication system and the operator of the WiFi network in order to permit access to the WiFi network using the pre-authorization of the user in the communication system. The communication system maintains a list of a set of networks ("supported networks") which can be used in accordance with the authorization system (e.g. "Skype Access"). This list is stored on a server (or on multiple servers) of the communication system. The list may be a list of identifiers, such as Service Set Identifiers (SSIDs), of the set of networks. Currently the Skype Access system can be used with hundreds of thousands of WiFi hotspots worldwide, but this number is likely to increase in the future.

In order for a device to determine whether a particular network can be accessed by a particular user, the device can query a server of the communication system, e.g. using the Domain Name System (DNS) protocol, and the server will check whether the particular network is in the list of supported networks to thereby check whether the particular network is supported or not. A network is a "supported network" if a user can use pre-authorization in the communication system in order to access the network. However, this check can only be performed after the device has already connected to a network (which may, or may not, be supported for use with the authorization system of the communication system) that allows DNS queries to be sent to the servers of the communication system. This presents a problem because the user will only find out that a particular network is not supported for use with the authorization system of the communication system after having connected to the particular network. This can be inconvenient for the user and may waste time for the user.

SUMMARY

In order to overcome the problem described above in relation to a user only finding out that a particular network is not supported for use with the authorization system of the communication system after having connected to the particular network, the list of identifiers of the supported set of networks can be transmitted from a server of the communication system to the device. This list can be transmitted to the device in advance of the device attempting to connect to a network and can be stored at the device for subsequent use. In this way, the SSIDs of wireless networks which are supported for use with the authorization system of the communication system may be provided to, and stored at, a device.

The inventor has realized that distributing the actual SSIDs of the supported networks is not space-efficient (i.e. it requires more bandwidth and memory space than is necessary) and also allows third parties to see which networks are supported. It may not be desirable to show third parties exactly which networks are supported. There is therefore provided herein a method and system for distributing information relating to supported wireless networks in a compact form and without revealing the SSIDs of the supported networks to third parties.

According to a first aspect of the invention there is provided a method of distributing information relating to a set of networks from a first node to a second node of a communication system, wherein a set of identifiers of respective networks which belong to the set of networks is stored at the first node, the method comprising: generating, at the first node, hash values for the identifiers in the set of identifiers using a hash function; transmitting the generated hash values from the first node to the second node; the second node determining an identifier of a particular network which is available for communicating with the second node; generating, at the second node, a hash value for the identifier of the particular network using said hash function; and comparing, at the second node, the hash value of the identifier of the particular network generated at the second node with the hash values received at the second node from the first node to thereby determine whether the particular network belongs to said set of networks.

In some embodiments, the method further comprises, if it is determined that the particular network belongs to said set of networks, the second node connecting to the particular network. In other embodiments, the method further comprises, if it is determined that the particular network belongs to said set of networks, displaying a list of the set of networks at the second node to a user of the second node. In these other embodiments, the user can choose to use network management software, or other suitable functionality, to access the network.

According to a second aspect of the invention there is provided a communication system for distributing information relating to a set of networks, the communication system comprising a first node and a second node, wherein the first node comprises: a store for storing a set of identifiers of respective networks which belong to the set of networks; means for generating hash values for the identifiers in the set of identifiers using a hash function; and means for transmitting the generated hash values to the second node; and wherein the second node comprises: means for receiving the hash values transmitted from the first node; means for determining an identifier of a particular network which is available for communicating with the second node; means for generating a hash value for the identifier of the particular network using said hash function; and means for comparing the hash value of the identifier of the particular network generated by the means for generating with the hash values received at the means for receiving from the first node to thereby determine whether the particular network belongs to said set of networks.

The hash values, rather than the SSIDs of the set (or "group") of networks, are transmitted from the first node. In preferred embodiments the size of the hash values is less than the average size of the identifiers. For example, the size of the hash values may be either 4 bytes or 8 bytes. The "size" of a hash value refers to the amount of data that the hash value consists of (e.g. a number of bits or bytes). Advantageously, this means that in preferred embodiments, the distribution of network information from the first node to the second node is performed in a more efficient way than distributing the full list of SSIDs. Furthermore, this is achieved without providing a full list of the SSIDs of the set of networks to third parties.

In preferred embodiments the set of networks is the set of supported networks to which the second node is allowed to connect (e.g. using the authorization system of the communication system). However, in some other embodiments, the method and system described above are not implemented in conjunction with the authorization system (e.g. Skype Access) of the communication system. In these other embodiments, the networks in the set of networks may be related to each other in some other way, for example, the network in the set of networks may be related to each other in that they are all owned by the same entity or in that they all use the same communication protocol, or in that they all share some other quality which may be relevant for the second node in communicating with a network from the set of networks. However, in all of the embodiments, the second node can use the hash values received from the first node to determine whether a particular network which is available for communication with the second node belongs to said set of networks.

In preferred embodiments, the first node is a server in the communication system and the second node is a user terminal in the communication system. The second node may comprise a communication client which when executed at the second node is configured to act as said means for determining, said means for generating and said means for comparing.

In some embodiments, one or more of the identifiers in the set of identifiers is a partial identifier. If the hash value of the particular network does not match with any of the hash values received at the second node from the first node then the second node may remove a character from the identifier (e.g. from the end of the identifier) of the particular network and then repeat the steps of (i) generating, at the second node, a hash value for the identifier of the particular network using said hash function and (ii) comparing the hash value of the identifier of the particular network generated at the second node with the hash values received at the second node from the first node to thereby determine whether the particular network belongs to said set of networks. This process is then repeated until the length of identifier becomes too small to reliably match an identifier from the set of identifiers (e.g. the length of the identifier becomes less than four characters) This is computationally very feasible, and provides a usable method for distributing a list of supported networks without revealing the full list of supported network names while maintaining the ability to search for partial matches.

There may be a plurality of networks which are available for communicating with the second node and the method may be repeated for each of those networks. In preferred embodiments, the networks are wireless networks.

According to a third aspect of the invention there is provided a method of distributing information relating to a set of networks from a first node to a second node of a communication system, wherein a set of identifiers of respective networks which belong to the set of networks is stored at the first node, the method comprising: generating, at the first node, hash values for the identifiers in the set of identifiers using a hash function; and transmitting the generated hash values from the first node to the second node, thereby allowing the second node to determine whether a particular network which is available for communicating with the second node belongs to said set of networks by comparing a hash value of an identifier of the particular network with the hash values transmitted from the first node.

According to a fourth aspect of the invention there is provided a computer program product comprising computer readable instructions for execution by computer processing means at a first node of a communication system for distributing information relating to a set of networks from the first node to a second node of the communication system, the instructions comprising instructions for carrying out the method according to the third aspect of the invention.

According to a fifth aspect of the invention there is provided a node of a communication system for distributing information relating to a set of networks to a further node of the communication system, said node comprising: a store for storing a set of identifiers of respective networks which belong to the set of networks; generating means for generating hash values for the identifiers in the set of identifiers using a hash function; and transmitting means for transmitting the generated hash values to the further node, thereby allowing the further node to determine whether a particular network which is available for communicating with the further node belongs to said set of networks by comparing a hash value of an identifier of the particular network with the hash values transmitted from said node.

According to a sixth aspect of the invention there is provided a method of processing information relating to a set of networks, the method comprising: receiving, from a first node at a second node of a communication system, hash values for identifiers of networks which belong to the set of networks, said hash values being generated using a hash function; the second node determining an identifier of a particular network which is available for communicating with the second node; generating, at the second node, a hash value for the identifier of the particular network using said hash function; and comparing, at the second node, the hash value of the identifier of the particular network generated at the second node with the hash values received at the second node from the first node to thereby determine whether the particular network belongs to said set of networks.

According to a seventh aspect of the invention there is provided a computer program product comprising computer readable instructions for execution by computer processing means at a second node of a communication system for processing information relating to a set of networks, the instructions comprising instructions for carrying out the method according to the sixth aspect of the invention.

According to an eighth aspect of the invention there is provided a node of a communication system for processing information relating to a set of networks, the node comprising: receiving means for receiving, from another node of the communication system, hash values for identifiers of networks which belong to the set of networks, said hash values being generated using a hash function; determining means for determining an identifier of a particular network which is available for communicating with the node; generating means for generating a hash value for the identifier of the particular network using said hash function; and comparing means for comparing the hash value of the identifier of the particular network generated by the generating means with the hash values received at the receiving means from the other node to thereby determine whether the particular network belongs to said set of networks.

BRIEF DESCRIPTION OF THE DRAWINGS

For a better understanding of the present invention and to show how the same may be put into effect, reference will now be made, by way of example, to the following drawings in which:

FIG. 1A shows a communication system according to a preferred embodiment;

DETAILED DESCRIPTION OF PREFERRED EMBODIMENTS

Figure 1B:
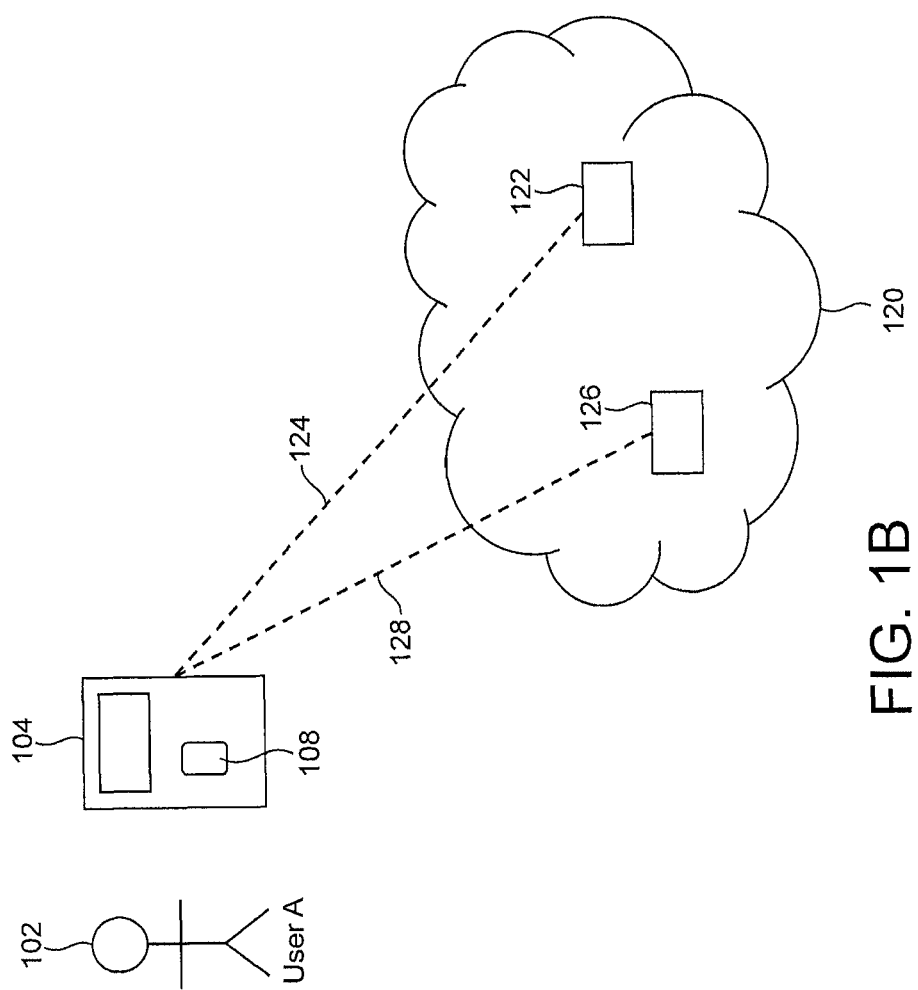
FIG. 1B shows a communication system and network according to a preferred embodiment.

Preferred embodiments of the invention will now be described by way of example only.

FIG. 1A shows a communication system comprising a first user ("User A") 102 who has an associated first user terminal 104, and a server 112. The user terminal 104 can communicate with the server 112 over the link 106 in the communication system. In a preferred embodiment the communication system is a packet-based, P2P communication system, but other types of communication system could also be used, such as non-P2P, VoIP or IM systems. The user terminal 104 may be, for example, a mobile phone, a personal digital assistant ("PDA"), a personal computer ("PC") (including, for example, Windows™, Mac OS™ and Linux™ PCs), a gaming device or other embedded device able to connect to the communication system and communicate with the server 112 when the link 106 is available. The user terminal 104 is arranged to receive information from and output information to the user 102 of the user terminal 104. In a preferred embodiment of the invention the user terminal 104 comprises a display such as a screen and an input device such as a keypad, touch-screen, joystick, keyboard and/or mouse. The user terminal 104 has a network interface for communicating over the link 106. The link 106 may be a wired or a wireless link. For example, the link 106 may be a link through the internet, thereby allowing the user terminal 104 to communicate with the server 112 over the internet.

Note that in alternative embodiments, the user terminal 104 can connect to the link 106 via additional intermediate networks. For example, if the user terminal 104 is a mobile device, then it may be able to connect to the link 106 via a cellular mobile network (for example a GSM or UMTS network).

The user terminal 104 executes a communication client 108, provided by a software provider associated with the communication system. The communication client 108 is a software program executed on a local processor in the user terminal 104. The client 108 performs the processing required at the user terminal 104 in order for the user terminal 104 to transmit and receive data over the communication system (e.g. on the link 106). As is known in the art, the client 108 may be authenticated to communicate over the communication system through the presentation of digital certificates (e.g. to prove that User A 102 is a genuine subscriber of the communication system—described in more detail in WO 2005/009019).

Figure 2:
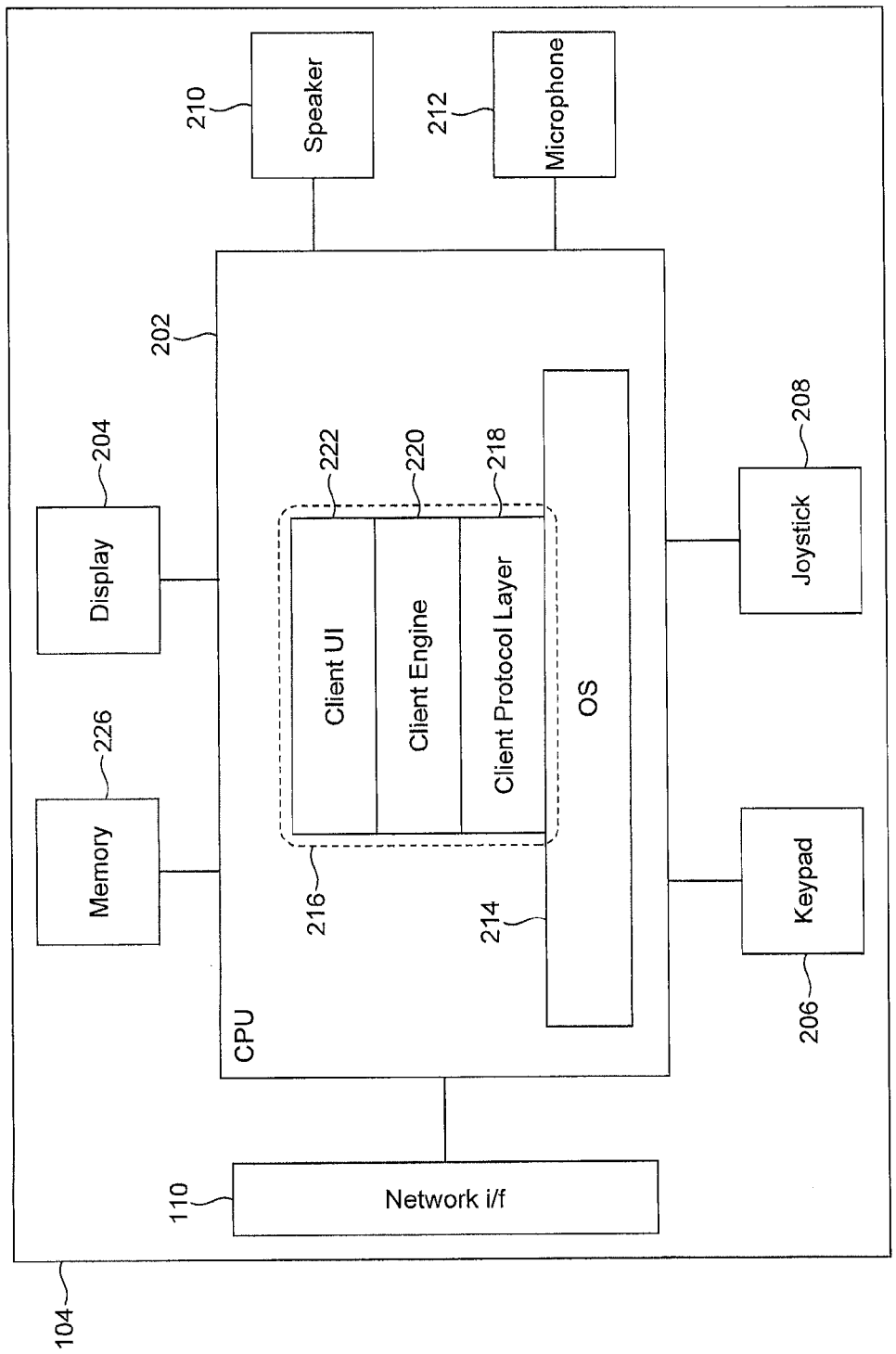
FIG. 2 shows a user terminal according to a preferred embodiment.

FIG. 2 illustrates a detailed view of the user terminal 104 on which is executed client 108. The user terminal 104 comprises a central processing unit ("CPU") 202, to which is connected a display 204 such as a screen, input devices such as a keypad (or a keyboard) 206 and a pointing device such as a joystick 208. The display 204 may comprise a touch screen for inputting data to the CPU 202. An output audio device 210 (e.g. a speaker) and an input audio device 212 (e.g. a microphone) are connected to the CPU 202. The display 204, keypad 206, joystick 208, output audio device 210 and input audio device 212 are integrated into the user terminal 104. In alternative user terminals one or more of the display 204, the keypad 206, the joystick 208, the output audio device 210 and the input audio device 212 may not be integrated into the user terminal 104 and may be connected to the CPU 202 via respective interfaces. One example of such an interface is a USB interface. The CPU 202 is connected to the network interface 110 which may be, for example, a modem for communication over the link 106. The network interface 110 may be integrated into the user terminal 104 as shown in FIG. 2. In alternative user terminals the network interface 110 is not integrated into the user terminal 104. The user terminal 104 also comprises a memory 226 for storing data as is known in the art.

FIG. 2 also illustrates an operating system ("OS") 214 executed on the CPU 202. Running on top of the OS 214 is a software stack 216 for the client 108. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the link 106 via the network interface 110. The client protocol layer 218 of the client software communicates with the operating system

214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 102 via the user interface of the client and to receive information from the user 102 via the user interface.

The server 112 includes a database (or "store") 114 for storing data. The server 112 also includes a CPU 116 for processing data. The server 112 has a network interface 118 for communicating over the link 106 with the user terminal 104. A server, which may be the server 112, but which is more likely another server in the communication system, provides communication services to the user terminal 112 in the communication system. For example, that server may facilitate call set up and handle calls for the user terminal 104 over the communication system, and/or may store data relating to the user 102 or the user terminal 104 which is relevant to the communication system (e.g. a list of contacts of the user 102 in the communication system). A person skilled in the art would be aware of many different functions which a server may perform to facilitate the user 102's engagement with the communication system.

FIG. 1B shows the user terminal 104 in a second situation in which the user terminal 104 can connect to a network 120 via an access point 122 (over a link 124) or via an access point 126 (over a link 128). The access point 122 represents a first wireless network in which the user terminal 104 may communicate, e.g. over the link 124. Similarly, the access point 124 represents a second wireless network in which the user terminal 104 may communicate, e.g. over the link 128. The links 124 and 128 are wireless links such as WiFi links. By communicating with the access points 122 or 126, the user terminal 104 can access the network 120. The network 120 may be, for example, the internet. There may be more or less access points (and therefore more or less wireless networks) than the two shown in FIG. 1B with which the user terminal 104 can communicate to thereby access the network 120.

In the preferred embodiments described herein the access points 122 and 126 may be situated in public locations such as in an airport, a coffee shop, a train station or a shopping centre.

As described above, an authorization system (such as the Skype Access system) for providing authorization for the user 102 to access the wireless network associated with the access point 122 (or that associated with access point 126) can be beneficial.

Not all wireless networks are currently supported for use with the Skype Access system. It is necessary to know which networks are supported for use with the Skype Access system (or other similar authorization systems). Therefore, the server 112 of the communication system stores a list of identifiers (e.g. Service Set Identifiers, SSIDs) of networks which support the authorization system using the users 102's authorization in the communication system. These networks may be referred to as "supported networks". SSIDs of other, unsupported, networks are not in the list of identifiers. Only the networks in the set of supported networks are supported for use with the authorization system of the communication system.

However, as described above, if the list of supported networks is only stored at the server 112 then in order for a user terminal to determine whether a particular network to which he can connect (e.g. via access point 122), and which is the only network he can currently connect to, is a supported network then he must connect to that network in order to query the server 112. This is clearly problematic if that network is not a supported network since this fact is only determined at the user terminal 104 after the user terminal 104 has connected to that network.

For overcoming this problem the list of supported SSIDs should be present on the user terminal 104 itself (e.g. for use by the client 108). This means that when the user terminal 104 determines that the wireless network associated with the access point 122 is available for communication with the user terminal 104 (e.g. because the access point 122 has come within range of wirelessly communicating with the user terminal 104), the user terminal 104 can determine whether that wireless network is a supported network without being required to contact the server 112 and without being required to connect to the access point 122.

Figure 3:
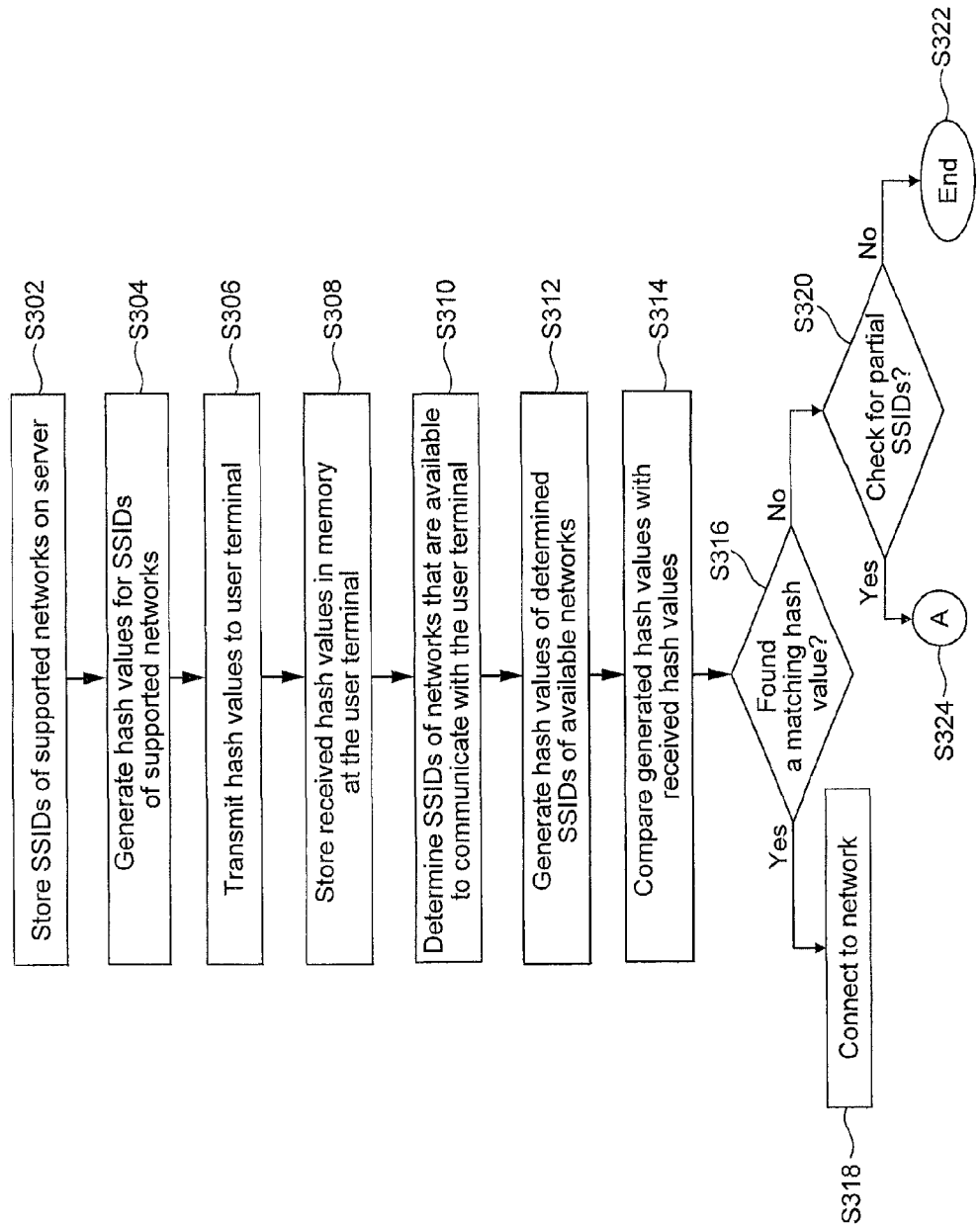
FIG. 3 is a flow chart for a process of distributing information relating to networks from a server to a user terminal according to a preferred embodiment.
Figure 4:
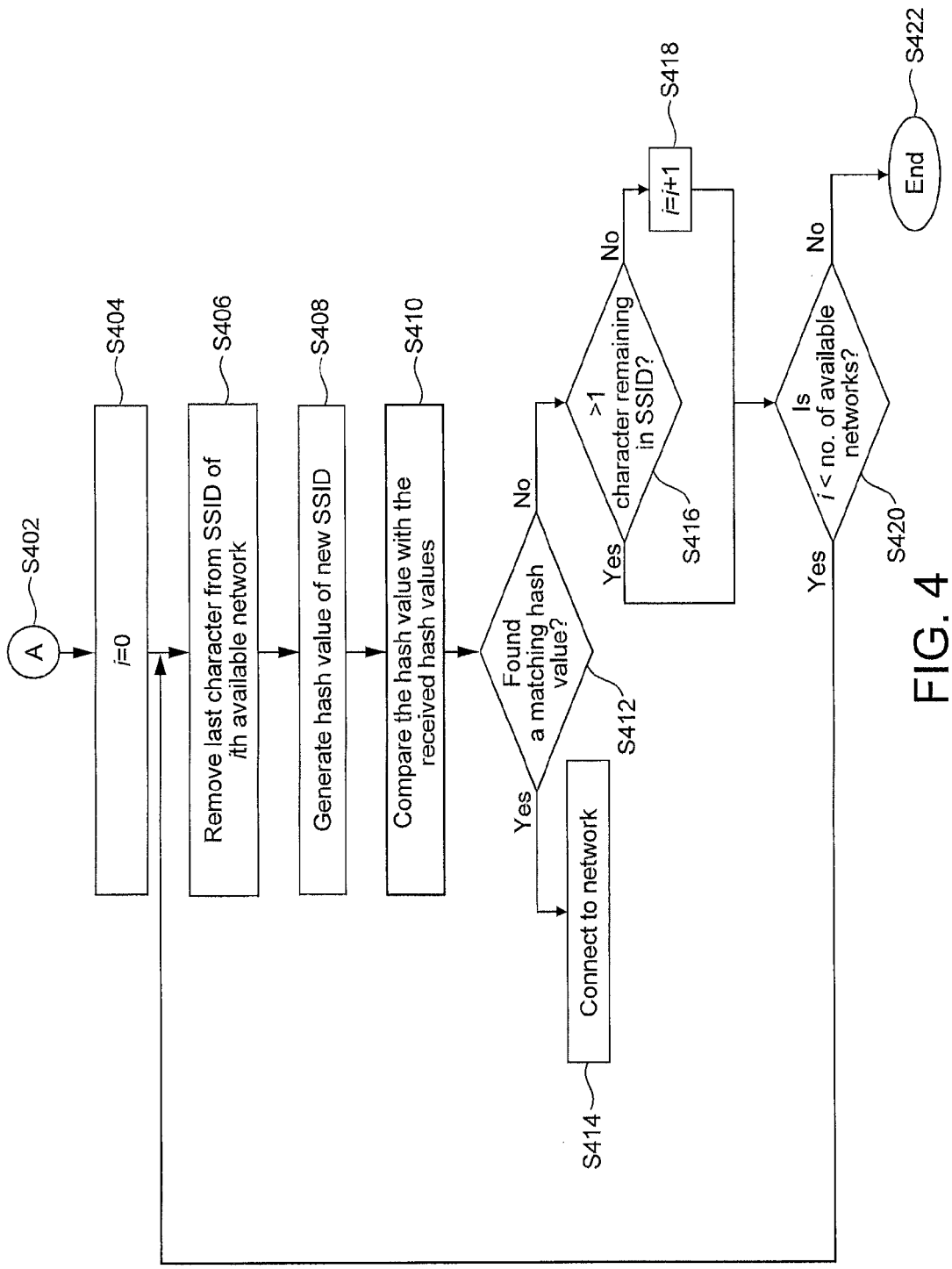
FIG. 4 is a flow chart for a process of finding matching partial identifiers according to a preferred embodiment.

With reference to FIGS. 3 and 4 there is described below a method for distributing information relating to the set of supported networks from the server 112 to the user terminal 104.

In step S302 a set of SSIDs is stored at the database 114 of the server 112, wherein the set of SSIDs identify the set of supported networks (i.e. those networks which the user terminal 104 may be able to connect to on the basis of authorization being provided from the user 102's account with the communication system). The set of SSIDs may be stored in more than one server in the communication system. The set of SSIDs identify the supported networks. The SSIDs are typically strings which are defined by the operators of the corresponding networks.

In step S304 the CPU 116 of the server 112 generates hash values for the SSIDs of the supported networks that were stored in the database 114 in step S302. Any suitable hash function may be used to generate the hash values in step S304. For example, the MD5 digest function may be used, and the first eight bytes of the result of the MD5 digest function may be taken for use as the hash values. Alternatively, the first four bytes of the result of the MD5 digest function may be taken for use as the hash values. Alternatively less, more, or different bytes may be used, provided that sufficient uniqueness of the hashing result can be guaranteed. The result of step S304 is a list of hash values for the SSIDs of the supported networks. The hash values are one-way hash values calculated from the SSID values.

In step S306 the hash values generated in step S304 are transmitted from the server 112 to the user terminal 104 (and also to other user terminals in the communication system, which, for clarity, have not been shown in the Figures). In this way the hash values are distributed from the server 112 to the user terminal 104. This distribution of the hash values may occur over any suitable communication channel (e.g. link 106) whenever the user terminal 104 (and in particular the client 108) is connected to the communication system (e.g. via the internet). The list of hash values may be updated whenever changes are made to the set of supported networks, and these updates to the hash values may be transmitted to the user terminal 104 whenever the user terminal 104 is connected to the communication system.

In step S308 the hash values received from the server 112 in step S306 are stored in the memory 226 of the user terminal 104. In this way the client 108 can access the list of hash values of SSIDs of supported networks from the local memory 226 of the user terminal 104, such that the client 108 is not required to contact the server 112 in order to access the list of hash values. In this sense, by storing the hash values at the user terminal 104, the hash values can be used at any time subsequent to receiving the hash values from the server 112 in step S306. For example, even though a connection with the server 112 is required for the hash values to be transmitted from the server 112 to the user terminal 104 in step S306, a connection with the server 112 is not required at some subsequent time in order to use the hash values at the user terminal 104 because the hash values are stored at the user terminal 104 in step S308.

Transmitting and storing the hash values is more efficient than transmitting and storing the actual SSIDs of the set of supported networks. This is because the average size of the SSIDs is greater than the size of the hash values. The term "size" here is used to mean the amount of data required to represent a SSID or a hash value. For example, an average SSID is over 11 characters in length, whereas the hash values in preferred embodiments are relatively short. Since the set of supported networks is currently relatively small (compared to the total number of networks in existence—both supported and unsupported), a hash value with 4 bytes would most likely be sufficient, and a hash value with 8 bytes is very good, for reliably assuming that each hash value will be unique. However, other sizes of hash values may be used. For example, there are currently hundreds of thousands of networks supported under the Skype Access system, but this number is likely to increase.

In step S310 (which may occur some time after step S308) the user terminal 104 (in particular, the client 108) determines the SSIDs of the networks that are available to communicate with the user terminal 104. For example, any wireless networks within range of wirelessly communicating with the user terminal 104 are considered to be available to communicate with the user terminal 104. This situation is shown in FIG. 1B. In the example, shown in FIG. 1B, the user terminal 104 can communicate with two wireless networks associated with the respective two access points 122 and 126. In other examples the user terminal 104 may be able to communicate with more or fewer networks. Step S310 may be initiated when the client 108 is initiated at the user terminal 104, and discovers that it has no network connection but that there are wireless networks (e.g. the wireless networks associated with the access points 122 and 126) within range. Step S310 may also be initiated by the user 102 instructing the client 108 to find available networks. Step S310 may also be initiated when the user terminal 104 moves to be within range of an access point.

In order to determine the SSIDs of the networks associated with the access points 122 and 126 the user terminal 104 communicates with the access points or listens on the communication frequency for the access points 122 and 126 for them broadcasting their SSIDs. A skilled person would be aware of how the user terminal 104 can determine the SSIDs of the wireless networks by communicating with the access points 122 and 126. The user terminal 104 should then determine whether the wireless networks are supported for use with the authorization system of the communication system (e.g. the Skype Access system) before possibly continuing to connect to one of the access points 122 or 126.

In step S312 the user terminal 104 (in particular, the client 108) generates hash values for the SSIDs that were determined in step S310. The hash values generated in step S312 are generated using the same hash function as was used in step S304 when the hash values were generated for the supported networks.

In step S314 the user terminal 104 (in particular, the client 108) compares the hash value(s) generated in step S312 with the hash values that were stored in the memory 226 at the user terminal 104 in step S308. The comparison performed in step S314 can be implemented very simply because the result is either "match" or "no match". The comparison in step S314 is not required to provide any further information as to how closely the hash values correspond to each other if they do not exactly match. Step S316 shows the determination as to whether the comparison in step S314 finds a match or not. For example, where only access point 122 is available to communicate with the user terminal 104 then the comparison of step S314 comprises determining whether the hash value generated in step S312 for the SSID of the wireless network associated with the access point 122 matches any of the hash values stored at the user terminal 104 in step S308.

If the comparison of the hash value of the SSIDs of the networks associated with the access points 122 and 126 do match one of the hash values stored at the user terminal 104 in step S308 then it is determined that the network is a supported network under the authorization system of the communication system (e.g. the Skype Access system). In other words it is determined that the network belongs to the set of networks for which SSIDs are stored at the server 112. This has been determined without providing the actual SSIDs from the server 112 to the user terminal 104 (since the hash values of the SSIDs are provided instead) and without requiring the user terminal 104 to connect to the server 112 in order to perform the determination. This provides an advantageous system for distributing information relating to a set of networks from the server 112 to the user terminal 104. This is advantageous because the hash values are smaller than the SSIDs, such that less bandwidth and storage capacity is required as compared to transmitting and storing the SSIDs themselves. Furthermore, since the hash values are provided to the user terminal 104 rather than the SSIDs, the method does not provide third parties with a full list of the supported networks' SSIDs. As such, the method and system described above for distributing information relating to a set of networks is more secure than transmitting SSIDs.

In the preferred embodiment shown in FIG. 3, when it is determined that the network associated with at least one of the access points 122 and 126 is one of the supported networks the method passes to step S318 in which the user terminal 104 connects to one of those networks to thereby connect to the network 120. This connection to the network 120 may be performed automatically in response to the determination in step S316 that the network associated with one of the access points 122 and 126 is a supported network. Alternatively, in response to the determination in step S316 that the network associated with one of the access points 122 and 126 is a supported network the client 108 may ask the user 102, via the user interface of the client 108, whether he wants to connect to the network 120. Where more than one network is in the list of supported networks, the client 108 may ask the user 102, via the user interface of the client 108, which of the networks (e.g. that associated with access point 122 or that associated with access point 126) he would like to connect to. If the user 102 agrees access the network 120 then he can indicate this to the client 108 by selecting an appropriate control in the user interface of the client 108 and then the client 108 will proceed to connect to the network 120 via the appropriate access point. However, the user 102 may decide that he does not want to access the network 120 and then he can indicate this to the client 108 by selecting another appropriate control in the user interface of the client 108 and the client 108 will then not proceed to connect to the network 120.

As an alternative to step S318, when it is determined that the network associated with at least one of the access points 122 and 126 is one of the supported networks, instead of connecting to the network 120, the client 108 may display a list of available supported networks to the user 102 via the user interface of the client 108. The user 102 may then decide whether or not to connect to one of the available supported networks at some later point in time.

The method described herein can be repeated for all available wireless networks.

However, if following step S316 it is determined that the hash value(s) generated in step S312 does not match with any of the hash values stored at the user terminal in step S308 then in step S320 it is determined whether to check for partial SSID matches. If the user terminal 104 does not implement partial SSID matches then the method passes to step S322 in which the method ends. In this scenario there are no available networks for the user terminal 104 to connect to which are supported networks. As such the user's authorization in the communication system cannot be used to connect the user terminal 104 to a network.

However, if the user terminal 104 does implement partial SSID matches then the method passes from step S320 to step S402 shown in FIG. 4. Some embodiments may always implement checking of partial SSID matches and as such the method may pass directly from step S316 to step S324 without the decision process of step S320. In these embodiments, the search for matching SSIDs may be exhaustive across all available SSIDs, down to a minimum reasonable number of characters in each SSID.

The authorization system of the communication system (e.g. the Skype Access system) may allow a partial SSID value to be defined on server side that will match many individual SSID values. For example, a partial SSID value "FON_" will match "FON_12345" and "FON_OFFICE", but will not match "FONETIC". Partial SSID matches can be found by doing a longer search. This search is computationally feasible because the number of different wireless networks which are available for communicating with the user terminal 104 at any given time is usually small and very limited. For example, the number of different wireless networks which are available for communicating with the user terminal 104 at a given time is usually within the range 0 to 10. In the example, shown in FIG. 1B there are two wireless networks which are available for communicating with the user terminal 104 (those associated with access points 122 and 126).

The method has passed to step S402 because no exact matches of hash values were found in the method of FIG. 3. In step S404 the variable i is set to zero. Then in step S406 the last character is removed from the SSID value of the ith available network (as determined in step S310). The method then performs the steps of generating (step S408) a hash value for the new SSID and comparing (step S410) the new hash value with the hash values that were stored in the user terminal 104 in step S308. Steps S408 and S410 are equivalent to steps S312 and S314 described above.

If in step S412 it is determined that the new hash value does match with one of the hash values of the supported networks then it is determined that the wireless network identified by the hash value belongs to the set of supported networks. In this case the method may pass to step S414 which is equivalent to step S318 described above in which the user terminal 104 connects to the network 120. As described above, the client 108 may ask the user 102 whether he wants to access the network 120 before actually connecting to the network 120 in step S414. Furthermore, as described above, as an alternative to step S414, when it is determined that the network associated with at least one of the access points 122 and 126 is one of the supported networks, instead of connecting to the network 120, the client 108 may display a list of available supported networks to the user 102 via the user interface of the client 108. The user 102 may then decide whether or not to connect to one of the available supported networks at some later point in time.

However, if it is determined in step S412 that the new hash value does not match any of the hash values stored at the user terminal in step S308 then the method passes to step S416 in which it is determined whether there are more than n characters remaining in the SSID of the ith available network. If there are more than n characters remaining in the SSID of the ith available network then the method passes straight to step S420. However, if there are not more than n characters remaining in the SSID of the ith available network then the method passes to step S418. In step S418 the value of i is incremented by one. The method passes from step S418 to step S420. The value of n indicates the minimum number of characters required for a reliable match. For example, n may be four. In other examples n may be more or less than four.

In step S420 it is determined whether i is less than the number of available networks which were determined in step S310. If i is not less than the number of available networks which were determined in step S310 then the method passes to step S422 in which the method ends. In this situation the method has searched for all partial matches for all of the SSIDs determined in step S310 and has not found a match. However, if i is less than the number of available networks which were determined in step S310 then there is still at least one partial SSID of at least one available network which has not been compared with the hash values stored in the user terminal 104 in step S308. In this case the method passes back to step S406, and repeats steps S406 to S420.

Therefore, according to the method shown in FIG. 4, if the exact match was not found in the method of FIG. 3, then the client 108 removes the last character from the SSID values, and repeats the search for matching hash values of the SSIDs that are still at least n characters long, repeating the operation until all possible hash values are exhausted.

To illustrate this, let us assume that "FON_" is a partial SSID, for which a hash value is present in the list of hash values distributed from the server 112 to the user terminal 104 in step S306. For example, the hash value of "FON_" is 5975bff094b364d8 when using the MD5 digest function as the hash function. With this partial SSID, an SSID value of "FON_12345" is an SSID of a supported network.

However, the hash value of "FON_12345" is de845a7288d87514 (when the MD5 digest function is used as the hash function) which does not match the hash value in the list. The client 108 then removes the last character from the SSID value (such that the new SSID value is "FON_1234") and calculates the hash value for the new SSID value. The hash value of "FON_1234" is 0329d375203d44 cc when using the MD5 digest function as the hash function, which again does not match the hash value in the list. The method continues and generates and compares hash values for SSID values of "FON_123", "FON_12" and "FON_1", which will also not match any of the hash values stored at the user terminal in step S308. Then the SSID is shortened to "FON_" which of course results in a matching hash value. In this way the method allows for partial SSIDs to be used, even though it is the hash values (rather than the SSID values themselves) that are distributed from the server 112 to the user terminal 104.

As an example, if there are 4 wireless networks within range of the user terminal 104, with average SSID length of 12 characters, and there are total of 1000 supported networks then the client 108 will have to calculate 4*11=44 hash values even if it would allow the minimum required length of SSID to be 1, and do 44000 comparisons of the hash values to perform an exhaustive search for full and partial matches. This is computationally very feasible, and provides a usable method for distributing a list of supported networks without revealing the full list of supported network names (SSIDs) while maintaining the ability to search for partial matches.

Where there are multiple supported networks available to the user terminal 104, the user terminal 104 may determine which of those available supported networks to connect to. This determination may be based, for example, on a priority value that is distributed along with hash values from the server 112 to the user terminal 104, where the priority value is determined at the server 112 and may be based on pricing, quality, and user preference based on previous use. The determination may also be based on factors determined at the user terminal 104 such as signal strength or other parameters of the wireless networks that are available to the client 108.

The method steps shown in the flow charts of FIGS. 3 and 4 are preferably implemented in software, e.g. by the client 108 and the CPU 116 of the server 112.

There may be provided computer program products comprising computer readable instructions for execution by computer processing means at the server 112 or at the user terminal 104, whereby the instructions comprise instructions for carrying out the method described above.

In some embodiments, each network may have its own unique SSID. However, in other embodiments, multiple networks may share an SSID, e.g. where different SSIDs start with the same prefix. For example, there may be a million networks in the system, but these networks may be identified using less than a thousand SSIDs or partial SSIDs. For example, the SSID "FON" is used to identify hundreds of thousands of networks in the Skype Access system, and only one SSID ("FON_") is stored for identifying all of these networks because all of the SSIDs start with "FON_".

While the invention has been described in relation to distributing hash values of SSIDs of networks which are supported by the authorization system of the communication system (e.g. the Skype Access system) the method may be used to distribute information relating to any sets of networks, whereby the networks in the set of networks may be linked by some other quality that is freely observable from the network, or equipment in the network. (e.g. they all use the same protocol or are all owned by a particular owner). The embodiments allow the user terminal 104 to determine whether an available wireless network belongs to the set of networks stored at the server 112 without requiring the user terminal 104 to connect to the server 112 and without providing the SSIDs of the networks in the set of networks to the user terminal 104.

Although in the preferred embodiments described above, the information is transmitted from a server to a user terminal in a communication system, in other embodiments, the information may be transmitted between any two different nodes of the communication system.

Although in the preferred embodiments described above, the networks are identified by their SSIDs, in other embodiments, other identifiers of the networks may be used either as well as, or instead of, the SSIDs. For example the Media Access Control (MAC) address may be used to identify the access points.

Although in the preferred embodiments described above, the hash function is a MD5 digest function, any other suitable one-way hash function could be used instead as would be apparent to a person skilled in the art.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of distributing information relating to a set of networks from a first node to a second node of a communication system, wherein a set of identifiers of respective networks which belong to the set of networks is stored at the first node, the method comprising:
    generating, at the first node, hash values for the identifiers in the set of identifiers using a hash function, wherein one of the identifiers in the set of identifiers is a partial identifier;
    transmitting the generated hash values from the first node to the second node;
    said transmitting causing the second node to determine an identifier of a particular network which is available for communicating with the second node;
    causing generation of, at the second node, a hash value for the identifier of the particular network using said hash function; and
    causing comparison of, at the second node, the hash value of the identifier of the particular network generated at the second node with the hash values received at the second node from the first node to thereby determine whether the particular network belongs to said set of networks, and wherein if the hash value of the identifier of the particular network does not match with any of the hash values received at the second node from the first node then the method comprises causing removal of a character from the identifier of the particular network and then repeating (i) causing generation of, at the second node, a hash value for the identifier of the particular network using said hash function and (ii) causing comparison of the hash value of the identifier of the particular network generated at the second node with the hash values received at the second node from the first node to thereby cause determination of whether the particular network belongs to said set of networks.

2. The method of claim 1 further comprising:
    if it is determined that the particular network belongs to said set of networks, the second node connecting to the particular network.

3. The method of claim 1 wherein the networks in said set of networks are supported networks to which the second node is allowed to connect.

4. The method of claim 1 wherein the size of the hash values is less than the average size of the identifiers.

5. The method of claim 1 wherein the second node determines the identifier of the particular network by communicating with the particular network or by receiving the identifier on a broadcast channel of the particular network.

6. The method of claim 1 wherein the identifiers in the set of identifiers and the identifier of the particular network are Service Set Identifiers.

7. The method of claim 1 wherein the transmitting the generated hash values from the first node to the second node comprises transmitting the generated hash values over the communication system from the first node to the second node.

8. The method of claim 1 wherein there are a plurality of particular networks which are available for communicating with the second node and wherein the method comprises repeating, for each of said particular networks:
   causing the second node to determine an identifier of the particular network which is available for communicating with the second node;
   causing generation of, at the second node, a hash value for the identifier of the particular network using said hash function; and
   causing comparison of the hash value of the identifier of the particular network generated at the second node with the hash values received at the second node from the first node to thereby determine whether the particular network belongs to said set of networks.

9. The method of claim 8 wherein a plurality of the particular networks are available for communicating with the second node, and the method further comprises determining which of the particular networks to connect to based on priority values for the respective particular networks provided from the first node to the second node.

10. The method of claim 9 wherein said determining which of the particular networks to connect to is also based on at least one factor determined at the second node relating to the particular networks.

11. A communication system for distributing information relating to a set of networks, the communication system comprising a first node and a second node, wherein the first node comprises:
   a store for storing a set of identifiers of respective networks which belong to the set of networks;
   a hash generator for generating hash values for the identifiers in the set of identifiers using a hash function; and
   a transmitter for transmitting the generated hash values to the second node; and wherein the first node is configured to interact with the second node which comprises:
   a receiver for receiving the hash values transmitted from the first node;
   a hash value store for storing the received hash values at the second node;
   a hash value determiner for determining a hash value for the identifier of the particular network using a hash function,
   the hash value determiner further enabled to compare the hash value of the identifier of the particular network with the hash values received from the first node to thereby determine whether the particular network belongs to said set of networks, and wherein if the hash value of the identifier of the particular network does not match with any of the hash values received at the second node from the first node then the second node being configured to remove a character from the identifier of the particular network and then repeat the (i) generating, at the second node, a hash value for the identifier of the particular network using said hash function and (ii) comparing the hash value of the identifier of the particular network generated at the second node with the hash values received at the second node from the first node to thereby determine whether the particular network belongs to said set of networks.

12. The communication system of claim 11 wherein the first node is a server in the communication system and the second node is a user terminal in the communication system.

13. The communication system of claim 12 wherein the second node comprises a communication client which when executed at the second node is configured to act as said means for determining, said means for generating and said means for comparing.

14. The communication system of claim 11 wherein said networks belonging to the set of networks and said particular network are wireless networks.

15. A method of distributing information relating to a set of networks from a first node to a second node of a communication system, wherein a set of identifiers of respective networks which belong to the set of networks is stored at the first node, the method comprising:
   generating, at the first node, hash values for the identifiers in the set of identifiers using a hash function, wherein one of the identifiers of the networks which belong to the set of networks is a partial identifier; and
   transmitting the generated hash values from the first node to the second node, thereby allowing the second node to determine whether a particular network which is available for communicating with the second node belongs to said set of networks by comparing a hash value of an identifier of the particular network with the hash values transmitted from the first node, and wherein if the hash value of the identifier of the particular network does not match with any of the hash values received at the second node from the first node then removing a character from the identifier of the particular network and then repeating the (i) generating, at the second node, a hash value for the identifier of the particular network using said hash function and (ii) comparing the hash value of the identifier of the particular network generated at the second node with the hash values received at the second node from the first node to thereby determine whether the particular network belongs to said set of networks.

16. The method of claim 15 wherein the size of the hash values is less than the average size of the identifiers.

17. One or more computer-readable storage memories comprising computer readable instructions for execution by computer processor at a first node of a communication system for distributing information relating to a set of networks from the first node to a second node of the communication system, wherein a set of identifiers of respective networks which belong to the set of networks is stored at the first node, the instructions comprising instructions for carrying out the operations comprising:
   generating hash values for the identifiers in the set of identifiers using a hash function; and
   transmitting the generated hash values from the first node to the second node, thereby allowing the second node to determine whether a particular network which is available for communicating with the second node belongs to said set of networks by comparing a hash value of an identifier of the particular network with the hash values transmitted from the first node, wherein one of the identifiers of the networks which belong to the set of networks is a partial identifier, and wherein if the hash value of the identifier of the particular network does not match with any of the hash values received at the second node from the first node then removing a character from the identifier of the particular network and then repeating the (i) generating, at the second node, a hash value for the identifier of the particular network using said hash function and (ii) comparing the hash value of the identifier of the particular network generated at the second node with the hash values received at the second node from the first node to thereby determine whether the particular network belongs to said set of networks, the second node being caused to join the particular network in response to the particular network being one of the set of networks.

18. A node of a communication system for distributing information relating to a set of networks to a further node of the communication system, wherein the node is a server in the communication system, said node comprising:
   a store for storing a set of identifiers of respective networks which belong to the set of networks;
   a hash generator for generating hash values for the identifiers in the set of identifiers using a hash function; and
   a transmitter for transmitting the generated hash values to the further node, thereby allowing the further node to determine whether a particular network which is available for communicating with the further node belongs to said set of networks by comparing a hash value of an identifier of the particular network with the hash values transmitted from said node, and wherein if the hash value of the identifier of the particular network does not match with any of the hash values received at the further node from the said node then the further node being configured to remove a character from the identifier of the particular network and then repeat the (i) generating, at the further node, a hash value for the identifier of the particular network using said hash function and (ii) comparing the hash value of the identifier of the particular network generated at the further node with the hash values received at the further node from the said node to thereby determine whether the particular network belongs to said set of networks, the further node being caused to join the particular network in response to the particular network being one of the set of networks.

19. A method of processing information relating to a set of networks, the method comprising:
   receiving, from a first node at a second node of a communication system, hash values for identifiers of networks which belong to the set of networks, said hash values being generated using a hash function, one of the identifiers of the networks which belong to the set of networks is a partial identifier;
   the second node determining an identifier of a particular network which is available for communicating with the second node;
   generating, at the second node, a hash value for the identifier of the particular network using said hash function; and
   comparing, at the second node, the hash value of the identifier of the particular network generated at the second node with the hash values received at the second node from the first node to thereby determine whether the particular network belongs to said set of networks, and wherein if the hash value of the identifier of the particular network does not match with any of the hash values received at the second node from the first node then the method comprises removing a character from the identifier of the particular network and then repeating the (i) generating, at the second node, a hash value for the identifier of the particular network using said hash function and (ii) comparing the hash value of the identifier of the particular network generated at the second node with the hash values received at the second node from the first node to thereby determine whether the particular network belongs to said set of networks.

20. The method of claim 19 further comprising:
   if it is determined that the particular network belongs to said set of networks, the second node connecting to the particular network.

21. The method of claim 19 wherein the networks in said set of networks are supported networks to which the second node is allowed to connect.

22. The method of claim 19 wherein the second node determines the identifier of the particular network by communicating with the particular network or by receiving the identifier on a broadcast channel of the particular network.

23. The method of claim 19 wherein there are a plurality of particular networks which are available for communicating with the second node and wherein the method comprises repeating, for each of said particular networks:
   the second node determining an identifier of the particular network which is available for communicating with the second node;
   generating, at the second node, a hash value for the identifier of the particular network using said hash function; and
   comparing the hash value of the identifier of the particular network generated at the second node with the hash values received at the second node from the first node to thereby determine whether the particular network belongs to said set of networks.

24. One or more computer-readable storage memories comprising computer readable instructions for execution by a computer at a second node of a communication system for processing information relating to a set of networks, the second node being a user terminal, the instructions comprising instructions for carrying out the operations comprising:
   receiving, from a first node of the communication system, hash values for identifiers of networks which belong to the set of networks, said hash values being generated using a hash function, the first node being a communication server, one of the identifiers of the networks which belong to the set of networks is a partial identifier;
   determining an identifier of a particular network which is available for communicating with the second node;
   generating a hash value for the identifier of the particular network using said hash function; and
   comparing the hash value of the identifier of the particular network generated at the second node with the hash values received at the second node from the first node to thereby determine whether the particular network belongs to said set of networks, and wherein if the hash value of the identifier of the particular network does not match with any of the hash values received at the second node from the first node then the method comprises removing a character from the identifier of the particular network and then repeating the (i) generating, at the second node, a hash value for the identifier of the particular network using said hash function and (ii) comparing the hash value of the identifier of the particular network generated at the second node with the hash values received at the second node from the first node to thereby determine whether the particular network belongs to said set of networks.

25. A node of a communication system for processing information relating to a set of networks, the node being a user terminal in the communication system, the node capable of operations comprising:
- receiving, from another node of the communication system, hash values for identifiers of networks which belong to the set of networks, said hash values being generated using a hash function, wherein one of the identifiers of the networks which belong to the set of networks is a partial identifier;
- determining an identifier of a particular network which is available for communicating with the node;
- generating a hash value for the identifier of the particular network using said hash function; and
- comparing the hash value of the identifier of the particular network with the hash values received from the other node to thereby determine whether the particular network belongs to said set of networks, and if the hash value of the identifier of the particular network does not match with any of the hash values received at the node from the other node then removing a character from the identifier of the particular network and then repeating the (i) generating, at the node, a hash value for the identifier of the particular network using said hash function and (ii) comparing the hash value of the identifier of the particular network generated at the node with the hash values received at the node from the other node to thereby determine whether the particular network belongs to said set of networks.

26. The node of claim 25 further comprising a communication client which when executed at the node is configured to act as said means for determining, said means for generating and said means for comparing.

27. A node of a communication system configured to process information relating to a set of networks, the node being a user terminal, the node comprising:
- a receiver configured to receive, from another node of the communication system, hash values for identifiers of networks which belong to the set of networks, said hash values being generated using a hash function, the other node being a server of the communication system, wherein one of the identifiers of the networks which belong to the set of networks is a partial identifier;
- a determining block configured to determine an identifier of a particular network which is available for communicating with the node, the particular network being a wireless network;
- a generating block configured to generate a hash value for the identifier of the particular network using said hash function; and
- a comparing block configured to compare the hash value of the identifier of the particular network generated by the generating block with the hash values received at the receiving block from the other node to thereby determine whether the particular network belongs to said set of networks, and if the hash value of the identifier of the particular network does not match with any of the hash values received at the node from the other node then removing a character from the identifier of the particular network and then repeating the (i) generating, at the node, a hash value for the identifier of the particular network using said hash function and (ii) comparing the hash value of the identifier of the particular network generated at the node with the hash values received at the node from the other node to thereby determine whether the particular network belongs to said set of networks.

\* \* \* \* \*